UNITED STATES PATENT OFFICE.

DANIEL J. MURNANE, OF TUXEDO PARK, MISSOURI.

PROCESS OF ABSORBING THE SURPLUS MERCURY IN THE MANUFACTURE OF MERCURY MIRRORS.

SPECIFICATION forming part of Letters Patent No. 658,321, dated September 18, 1900.

Application filed January 20, 1900. Serial No. 2,197. (No specimens.)

*To all whom it may concern:*

Be it known that I, DANIEL J. MURNANE, a citizen of the United States, residing at Tuxedo Park, in the county of St. Louis and State of Missouri, have invented certain new and useful Improvements in a Process of Absorbing the Surplus Mercury in the Manufacture of Mercury Mirrors, of which the following is a full, clear, and exact description, which will enable others skilled in the art to which it appertains to use the same.

Heretofore in the manufacture of mercury-back mirrors it has been necessary to place the latter upon an inclined table or rack immediately after the mirror has been made, whereby the surplus mercury remaining in the amalgam may be gradually drained from the mirror, which method consumes many days, as the mercury will continue to pass off from the mirror for an indefinite length of time after the same has been set or placed in position, which is very objectionable and is a decided loss as well as a constant source of annoyance in the manufacture of this class of mirrors, for the reason that after the mirror has been removed from the inclined table or rack the same must be kept in the position it was drained while handling, shipping, and when in its permanent position, otherwise the surplus mercury which has accumulated at its lower edge will pass back under the amalgam, and thereby damage or frost the mirror, rendering the same practically unmerchantable.

I have now discovered that, by the employment of granulated or pulverized metal, preferably obtained from block-tin, the same being applied on the amalgam or back of the mirror after the latter has been removed from a suitable table, said metal will absorb all the surplus mercury in a short period of time, the length of time being determined by the quantity of metal used, leaving the amalgam in such a hard or dry condition that the same may be subjected to unusual rough usage in handling and shipping, besides the mirror hardened under this process can be inverted or placed in any position without the slightest danger of damaging the mirror, and, further, the mercury which has heretofore passed from such mirrors after the same have been removed from the table and lost is entirely absorbed by the metal, and thereby saved for further use, the metal, together with the mercury absorbed thereby, being separated in the well-known manner.

By the employment of my process and the application of the granulated or pulverized metal to the amalgam or back of the mirror a complete and perfect mirror can be made in a short period of time, leaving the amalgam or back of the mirror in a harder and drier condition than a mirror drained by the old process in many months, and, in fact, if necessity requires it, a mirror can be made in a few hours, whereas under the old process of draining, as heretofore described, it required many weeks to complete a mirror of this character before it was sufficiently dry to handle, which has always been an objectionable feature and a constant annoyance in the manufacture of mercury-back mirrors, and even then it was necessary that the mirror be handled by the most experienced persons, trained and skilled in this particular line of business, for the reason that the least friction brought to bear upon the amalgam in handling the mirror will damage the same.

Having fully described my process, what I desire to secure by Letters Patent is—

1. The herein-described process for absorbing the surplus mercury in the manufacture of mercury-back mirrors, which consists in the application of metal capable of absorbing mercury to the amalgam back of the mirror, substantially as described.

2. The herein-described process for absorbing the surplus mercury in the manufacture of mercury-back mirrors, which consists in the application of granulated or pulverized metal capable of absorbing mercury in the proper quantity to the amalgam back of the mirror, substantially as described.

3. The herein-described process for absorbing the surplus mercury in the manufacture of mercury-back mirrors, which consists in the application of granulated or pulverized tin to the amalgam back of the mirror, substantially as described.

In testimony whereof I affix my signature in presence of two witnesses.

DANIEL J. MURNANE.

Witnesses:
C. J. ANDERSON,
C. F. KELLER.